United States Patent [19]

Kudo et al.

[11] 3,976,494

[45] Aug. 24, 1976

[54] PROCESS FOR INHIBITING CORROSION OF IRON OR STEEL PLACED IN CEMENT PRODUCTS

[75] Inventors: Norihiro Kudo, Narashino; Hiroshi Ibe, Koganei, both of Japan

[73] Assignee: Onoda Cement Company, Ltd., Yamaguchi, Japan

[22] Filed: Dec. 19, 1974

[21] Appl. No.: 534,187

[30] Foreign Application Priority Data

Dec. 27, 1973 Japan.............................. 49-144444
Mar. 12, 1974 Japan.............................. 49-27705

[52] U.S. Cl.................................. 106/14; 106/90; 106/98; 252/389 R; 252/389 A
[51] Int. Cl.².......................................... C04B 7/35
[58] Field of Search.................. 106/14, 13, 90, 98, 106/100, 102, 89; 252/389 A, 389 R, 75, 77, 389; 260/953, 462

[56] References Cited

UNITED STATES PATENTS

| | | |
|---|---|---|
| 2,830,069 | 4/1958 | Smith................................... 260/953 |
| 3,422,166 | 1/1969 | Davis..................................... 106/14 |
| 3,427,175 | 2/1969 | Angstadt et al....................... 106/89 |
| 3,729,497 | 4/1973 | Sawyer et al.................... 260/462 R |

Primary Examiner—Lorenzo B. Hayes
Attorney, Agent, or Firm—Oblon, Fisher, Spivak, McClelland & Maier

[57] ABSTRACT

This invention relates to a process for inhibiting corrosion of iron or steel such as reinforcing bars etc. placed in cement products such as paste, mortar and concrete containing a chloride which comprises adding a nitrite and a phosphoric ester, a nitrite and a boric ester or a nitrite and a mixture of a phosphoric ester and a boric ester to the cement.

10 Claims, 2 Drawing Figures

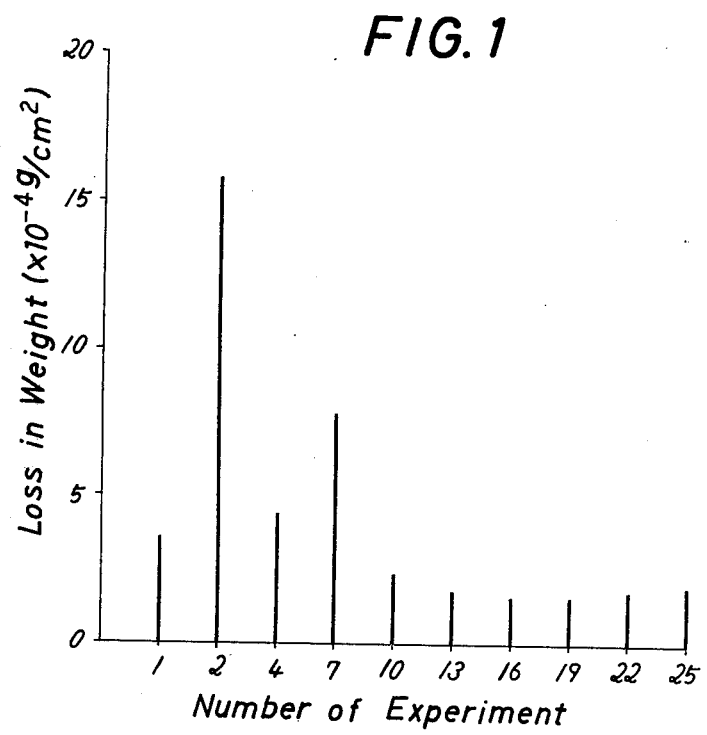

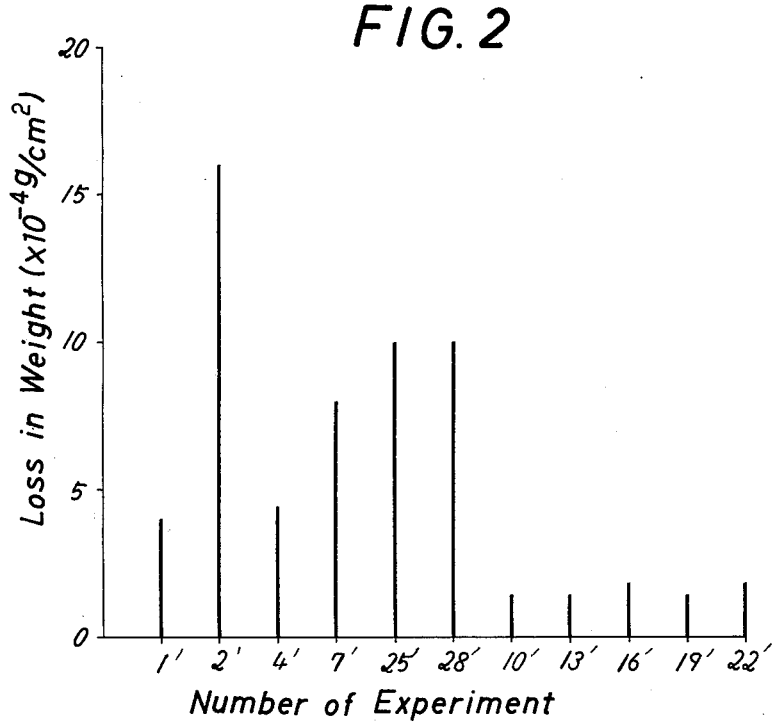

PROCESS FOR INHIBITING CORROSION OF IRON OR STEEL PLACED IN CEMENT PRODUCTS

This invention relates to a process for inhibiting corrosion of iron or steel such as reinforcing bars etc. placed in cement products such as paste, mortar and concrete containing a chloride.

A chloride such as calcium chloride has been generaly used as a hardening accelerator or an anitfreezing agent of cement products made from portland cement or portland-type cement and river sand has shown a tendency to be replaced by saline sea sand for lack thereof. The addition of these salts is not preferable to iron and steel reinforcement in cement products because the salts corrode iron and steel. Accordingly, alkali metal nitrite or dichromate has been individually used to inhibit the corrosion of iron or steel by the salts. However, when only alkali metal nitrite is used, a comparative large amount of the nitrite must be added to cement products to inhibit the corrosion of iron or steel, while when only alkali metal dichromate is used, the corrosive attack may be randomly distributed in small areas as pitting. One of the present inventors has developed a process for inhibiting corrosion of iron or steel placed in the cement products by adding an alkali metal nitrite and an alkali metal dichromate.

As a result of our further studies as to inhibiting corrosion of iron and steel, we found that when a nitrite and a phosphoric and/or a boric esters were used to the cement, the most excellent inhibiting effect for corrosion was obtained.

In order more fully to demonstrate the present invention, we shall explain about the experimental results.

A proportion of concrete used in the experiments consists of 300 kg/m3 of normal portland cement, 180 kg/m3 of water and 760 kg/m3 of river sand. A 2% solution of $CaCl_2$ was used as a corrosive agent. The concentration of $CaCl_2$ corresponded to the concentration of Nacl in the sea water.

The inhibitors used in the experiments are as follows:
1. Sodium nitrite ($NaNO_2$)
2. Calcium nitrite ($Ca(NO_2)_2$)
3. Polyoxyethylene-bis-glycerol borate monooleite
4. A mixture of $NaNO_2$ or $Ca(NO_2)_2$ and mono-ester, di-ester and a very small amount of tri-ester of polyoxyethylene nonyl phenyl phosphate (P content of 3.6%) and weight ratios of the nitrite/the phosphoric ester are 9 : 1 and 8 : 2.
5. A mixture of $NaNO_2$ or $Ca(NO_2)_2$ and polyoxyethylene-bis-glycerol borate and weight ratios of the nitrite/the borate are 9 : 1 and 8 : 2.
6. A mixture of $NaNO_2$ or $Ca(NO_2)_2$ and polyoxyethylene-bis-glycerol borate monooleite and weight ratios of the nitrite/the borate monooleite are 9 : 1 and 8 : 2.

When nitrite is mixed with phosphoric ester, pH value of phosphoric ester was previously adjusted to over 6.0 with calcium hydroxide, as nitrous oxide gas is generated by the reaction of nitrite and phosphoric ester.

The above inhibitors were added 0.05, 0.1 and 0.5% (wt.) for the calcium chloride solution, respectively. The surface of steel bar ($\phi$ 4×100 mm) was smoothed the surface by grinding and a section of the steel bar and a boundary on which the steel bar is in contact with the solution were painted with white Vaseline, because the section and the boundary are easy to be corroded and then the steel bar was soaked in the calcium chloride solution. the corrosion of the steel bar was detected by method for measuring the potential difference of the steel bar in the state sealed the surface of the solution with fluid paraffin to prevent oxydation of the solution.

The results are shown in Table 1 and Table 2.

Table 1

| Number | Concentration of $CaCl_2$ (%) | Inhibitor Kind | Ratio | Added amount (%) | Ph 11.5 | Ph 12.0 | Ph 12.3–12.4 |
| --- | --- | --- | --- | --- | --- | --- | --- |
| 1 | 0 | None | — | — | X | O | O |
| 2 | 2 | " | — | — | X | X | X |
| 3 | " | $NaNO_2$ | — | 0.05 | X | X | X |
| 4 | " | " | — | 0.1 | X | X | X |
| 5 | " | " | — | 0.5 | X | O | O |
| 6 | " | $Ca(NO_2)_2$ | — | 0.05 | X | X | X |
| 7 | " | " | — | 0.1 | X | X | X |
| 8 | " | " | — | 0.5 | X | X | O |
| 9 | " | $NaNO_2$ + Phosphoric ester A | 9:1 | 0.05 | X | X | X |
| 10 | " | " | " | 0.1 | X | O | O |
| 11 | " | " | " | 0.5 | O | O | O |
| 12 | " | $NaNO_2$ + Phosphoric ester B | " | 0.05 | X | X | O |
| 13 | " | " | " | 0.1 | X | O | O |
| 14 | " | " | " | 0.5 | O | O | O |
| 15 | " | $NaNO_2$ + Phosphoric ester C | " | 0.05 | X | X | O |
| 16 | " | " | " | 0.1 | X | O | O |
| 17 | " | " | " | 0.5 | O | O | O |
| 18 | " | $NaNO_2$ + Phosphoric ester C | 8:2 | 0.05 | X | X | O |
| 19 | " | " | " | 0.1 | X | O | O |
| 20 | " | " | " | 0.5 | O | O | O |
| 21 | " | Ca(NO) + Phosphoric ester C | 9:1 | 0.05 | X | X | O |
| 22 | " | " | " | 0.1 | X | O | O |
| 23 | " | " | " | 0.5 | O | O | O |
| 24 | " | Ca(NO) + Phosphoric ester C | 8:2 | 0.05 | X | X | O |
| 25 | " | " | " | 0.1 | X | O | O |

Table 1-continued

| Number | Concentration of CaCl$_2$ (%) | Inhibitor Kind | Ratio | Added amount (%) | Ph 11.5 | 12.0 | 12.3–12.4 |
|---|---|---|---|---|---|---|---|
| 26 | '' | '' | '' | 0.5 | O | O | O |

Note:
1. pH value of the solution was adjusted with Ca(OH)$_2$.
2. The dosage of the inhibitor was based on 2% CaCl$_2$ solution.
3. Phosphoric ester A was neutralized with calcium hydroxide, phosphoric ester B with sodium hydroxideand phosphoric ester C with triethanole amine.
4. The corrosion of the steel bar was decided by measurement of the potential difference of the steelbar corresponding to calomel electrode for 7 days.
Mark "O" shows that the potential difference changed in the direction of noble at above −300 mv withthe lapse of time.
Mark "X" shows that the potential difference changed in the direction of less noble at below −300 mvwith the lapse of time.

Table 2

| Number | Concentration of CaCl$_2$ (%) | Inhibitor Kind | Ratio | Added amount (%) | Ph 11.5 | 12.0 | 12.3–12.4 |
|---|---|---|---|---|---|---|---|
| 1' | 0 | None | — | — | X | O | O |
| 2' | 2 | '' | — | — | X | X | X |
| 3' | '' | NaNO$_2$ | — | 0.05 | X | X | X |
| 4' | '' | '' | — | 0.1 | X | X | X |
| 5' | '' | '' | — | 0.5 | X | O | O |
| 6' | '' | Ca(NO$_2$)$_2$ | — | 0.05 | X | X | X |
| 7' | '' | '' | — | 0.1 | X | X | X |
| 8' | '' | '' | — | 0.5 | X | X | O |
| 9' | '' | NaNO$_2$ + (A) | 9:1 | 0.05 | X | X | O |
| 10' | '' | '' | '' | 0.1 | X | O | O |
| 11' | '' | '' | '' | 0.5 | O | O | O |
| 12' | '' | NaNO$_2$ + (B) | '' | 0.05 | X | X | O |
| 13' | '' | '' | '' | 0.1 | X | O | O |
| 14' | '' | '' | '' | 0.5 | O | O | O |
| 15' | '' | '' | 8:2 | 0.05 | X | X | O |
| 16' | '' | '' | '' | 0.1 | X | O | O |
| 17' | '' | '' | '' | 0.5 | O | O | O |
| 18' | '' | Ca(NO$_2$)$_2$ + (B) | 9:1 | 0.05 | X | X | O |
| 19' | '' | '' | '' | 0.1 | X | O | O |
| 20' | '' | '' | '' | 0.5 | O | O | O |
| 21' | '' | '' | 8:2 | 0.05 | X | X | O |
| 22' | '' | '' | '' | 0.1 | X | O | O |
| 23' | '' | '' | '' | 0.5 | O | O | O |
| 24' | '' | (A) | — | 0.05 | X | X | X |
| 25' | '' | '' | — | 0.1 | X | X | X |
| 26' | '' | '' | — | 0.5 | X | X | X |
| 27' | '' | (B) | — | 0.05 | X | X | X |
| 28' | '' | '' | — | 0.1 | X | X | X |
| 29' | '' | '' | — | 0.5 | X | X | X |

Note:
1. (A) shows polyoxyethylene-bis-glycerol borate.
2. (B) shows polyoxyethylene-bis-glycerol borate monooleite.
3. The adjustment of pH and the added amount of the inhibitor are the same as these in the table 1.
4. The method for measuring the corrosion of the steel bar is the same as that in the table 1.

The loss in weight of the steel bar was further measured by a method which comprises soaking the steel bar for 7 days in the calcium chloride solution (CaCl$_2$ 2%) adjusted pH value of the solution to 12.0 with Ca(OH)$_2$ and then removing the rust of the steel bar by soaking in the 10% solution of ammonium citrate.

The results are shown in FIG. 1. and FIG. 2.

FIG. 1 and 2 show the results, respectively, which were obtained by the corrosion test of the steel bar soaked in the calcium chloride solution. FIG. 1 is a case added to the cement with a nitrite and a phosphoric ester and the numbers of experiment in FIG. 1 correspond to the numbers of the above Table 1 and FIG. 2 is a case added to the cement with a nitrite and a boric ester and the numbers of experiment in FIG. 2 correspond to the numbers of the above Table 2.

It is found from Table 1 and FIG. 1 that the effect of the mixed inhibitor consisting of a nitrite and a phosphoric ester is very excellent even at lower pH values, so the added amount of the mixed inhibitor may be used less than that of NaNO$_2$ or Ca(NO$_2$)$_2$. The occurrence of the rust on the steel bar was shown at the mark "O" and "X" according to observation with the naked eye. The judged mark "O" does not show the occurrence of the rust and the judged mark "X" shows the existence of the rust. In the case of "X", the surface of steel bar got rusty completely and pitting corrosion was found partially in the surface.

It is found also from Table 2 and FIG. 2 that the effect of the mixed inhibitor consisting of a nitrite and polyoxyethylene-bis-glycerol borate or polyoxyethylene-bis-glycerol borate monooleite is very excellent even at lower pH value and at smaller amount of addition than that of NaNO$_2$, Ca(NO$_2$)$_2$, polyoxyethylene-bis-glycerol borate or polyoxyethylene-bis-glycerol borate monooleite. The occurrence of the rust on the steel bar was shown at the mark "O" and "X" according to observation with the naked eye. The judged mark "O" does not show the occurrence of the rust and the judged mark "X" shows the occurrence of the rust as shown the above and in the case of "X", the surface of the steel bar get rusty completely and pitting corrosion was found partially in the surface.

Then, a mortar product added with the inhibiters of the present invention has practically the same properties as that added with only nitrite in regard to the physical property test and the exposure test in the open air and the setting time of the mortar added with a mixture of a nitrite and a phosphoric ester and a mixture of a nitrite and boric ester was retarded for 30–40 minutes and 10–30 minutes, respectively, but comparing with that of the mortar without the addition of the inhibitor, the setting time was shortened and the bending and compressive strength increased. Accordingly, it was found that the hardening of cement was not influenced badly by the addition of the inhibitors of the present invention. The exposure test in the open air was carried out as follows:

The amount of $CaCl_2$ corresponding to 0.1 or 0.5% of chlorine in the sand and a mixed inhibitor consisting of a nitrite and a phosphoric or a boric ester were added to a mortar consisting of a mixed ratio of normal portland cement: standard sand=1 : 2 according to the Japanese Industrial Standard (JIS R 5201). The resultant mortar was placed into a mold (4×4×16cm) in which mild steel bars were arranged. The mold was exposed in the open air for three months and thereafter the extent of corrosion of the mild steel bars was observed.

The results of the experiment were shown in Table 3 and 4.

It was found from Table 3 and 4 that when the content of chloride in the sand contained in the mortar was about 0.1%, the mixture of 8/500 part of a nitrite and 1/500 part of a phosphoric ester or a boric ester per 1 part of a chloride was effective for the inhibition of corrosion and even if the content of chloride was 0.5%, the mixture of 20/500 part of a nitrite and 2.5/500 part of a phosphoric ester or a boric ester was effective.

Furthermore, the corrosion test of steel in mortar and physical property test of mortar was carried out by adding sodium chloride, potassium chloride and magnesium chloride in place of calcium chloride, and adding potassium salt, magnesium salt and zinc salt in place of sodium nitrite and calcium nitrite. The same results as the above were obtained in these experiments.

Table 3

| Chloride in sand (%) | Inhibitor | Added amount for chloride | Appearance of rust |
|---|---|---|---|
| 0 | None | — | None |
|  | None | — | great number of small rust |
| 0.1 | $NaNO_2$ | 10/500 | " |
|  | $NaNO_2$ + A (9:1) | 10/500 | None |
|  | $NaNO_2$ + A (8:2) | " | " |
|  | $NaNO_2$ + C (9:1) | " | " |
|  | $NaNO_2$ + C (8:2) | " | " |
|  | None | — | all surface great number of small rust |
|  | $Ca(NO_2)_2$ | 25/500 | " |
| 0.5 | $Ca(NO_2)_2$ + B (9:1) | 25/500 | None |
|  | $Ca(NO_2)_2$ + B (8:2) | " | " |
|  | $Ca(NO_2)_2$ + C (9:1) | " | " |
|  | $Ca(NO_2)_2$ + C (8:2) | " | " |

Note:
[A], [B] and [C] show the same phosphoric ester as Table 1, respectively.

Table 4

| Chloride in sand (%) | Inhibitor | Added amount for chloride | Appearance of rust |
|---|---|---|---|
| 0 | None | — | None |
|  | None | — | great number of small rust |
| 0.1 | $NaNO_2$ | 10/500 | " |
|  | $NaNO_2$+[A] (9:1) | 10/500 | None |
|  | $NaNO_2$+[A] (8:2) | " | " |
|  | $NaNO_2$+[B] (9:1) | " | " |
|  | $NaNO_2$+[B] (8:2) | " | " |
|  | $Ca(NO_2)_2$+[B] (9:1) | " | " |
|  | $Ca(NO_2)_2$+[B] (8:2) | " | " |
|  | None | — | all surface great number of small rust |
|  | $Ca(NO_2)_2$ | 25/500 | " |
| 0.5 | $NaNO_2$+[A] (9:1) | 25/500 | None |
|  | $NaNO_2$+[A] (8:2) | " | " |
|  | $NaNO_2$+[B] (9:1) | " | " |
|  | $NaNO_2$+[B] (8:2) | " | " |
|  | $Ca(NO_2)_2$+[B] (9:1) | " | " |
|  | $Ca(NO_2)_2$+[B] (8:2) | " | " |

Note:
[A] and [B] show the same boric esters as Table 1, respectively.

The present invention is based on the above experimental results and relates to a process for inhibiting corrosion iron or steel placed in cement products as reinforcing bars, etc. which comprises adding a nitrite and a phosphoric and/or a boric esters to the paste the mortar or the concrete.

The present invention is applied to portland cement or portlandtype cement containing a chloride as an accelerator of said cement.

In the present invention, calcium chloride, sodium chloride, potassium chloride and/or magnesium chloride are used as chlorides, and sodium nitrite, potassium nitrite, calcium nitrite, magnesium nitrite and/or zinc nitrite are used as nitrites.

Furthermore, the following phosphoric mono-ester, di-ester and/or tri-ester are used as phosphoric esters:

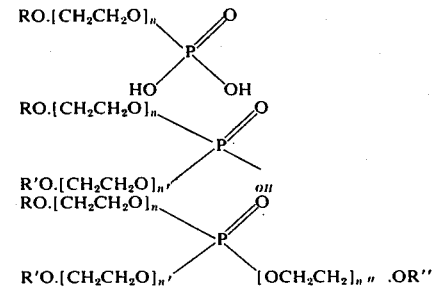

Note:
n, n' and n'' show mean mols of ethylene oxide (1~20) R, R' and R'' show alkyl radical, phenyl radical or alkylaryl radical (C=6~30)

These esters contain, for example, polyoxyethylene phenyl phosphate, polyoxyethylene octyl phenyl phosphate, polyoxyethylene nonyl phenyl phosphate, polyoxyethylene cetyl phosphate, polyoxyethylene lauryl phosphate, polyoxyethylene oleyl phosphate and the like, and also the following bis-polyalcohol borate, bis-polyalcohol borate alkylate, polyoxyethylene bis-polyalcohol borate and/or polyoxyethylene-bis-polyalcohol borate alkylate are used as boric esters:

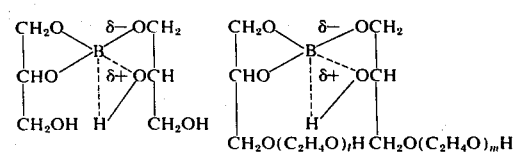

-continued

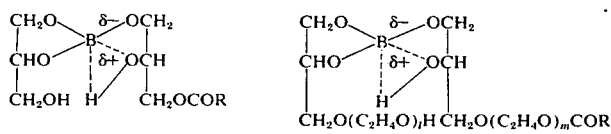

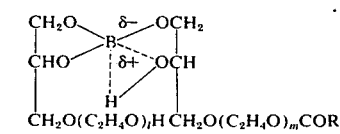

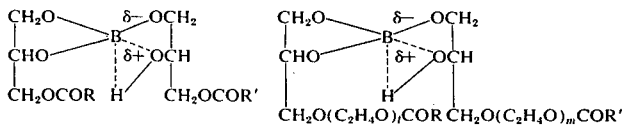

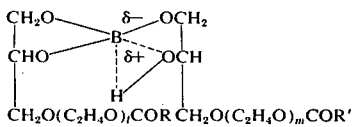

Note:
l and m show 1~20
R and R' show alkyl radical, phenyl radical or alkylaryl radical (C=6~21)

These esters contain, for example, bis-glycerol borate, bis-glycerol borate monopalmitate, bis-glycerol borate di-laurate, polyoxyethylene-bis-glycerol borate, polyoxyethylene-bis-glycerol borate monolaurate, polyoxyethylene-bis-glycerol borate di-stearate, polyoxyethylene-bis-glycerol borate laurate palmitate, polyoxyethylene-bis-glycerol borate mono-benzoate and the like.

A nitrite, a phosphoric ester, a boric ester and a mixture of a phosphoric and a boric esters are added ½ ~ 1/500 weight part, 1/50 ~ 1/500 weight part, 1/50 ~ 1/500 weight part and 1/50 ~ 1/500 weight part per weight part of a chloride, respectively.

On adding a phosphoric ester to a nitrite, pH value of the phosphoric ester must be previously adjusted to over 6.0 with the addition of an alkaline substance, such as calcium hydroxide, magnesium hydroxide, sodium hydroxide, potassium hydroxide, ammonium hydroxide, triethanolamine and the like, preferably triethanolamine, however on adding a phosphoric ester to cement mortar or concrete and then a nitrite to the resultant mixture, there is no use in neutralizing the phosphoric ester with the alkaline substance as the phosphoric ester is neutralized with the alkaline substance in the cement mortar or concrete. On adding a nitrite and a boric ester to cement mortar or concrete, the nitrite and the boric ester can be added thereto separately or as a mixture.

According to the present invention, corrosion of reinforcing iron or steel placed in cement products containing a chloride can be inhibited with small amount of the present mixed inhibitor and further the present inhibitor does not harm to the physical properties of the hardened cement products. According to the present invention, sand containing chloride, or sea sand, can be used to cement products as a fine granule.

EXAMPLE 1

Sodium nitrite and a mixture of mono-and di-polyoxyethylene phenyl phosphate (n=8, P content 5.8%) which was neutralized with triethanolamine were mixed with 1/10 weight part and 1/250 weight part per weight part of calcium chloride, respectively and the mixture and 2% (wt) of calcium chloride per weight of normal portland cement were added to the mixing water of PS concrete. The proportion of the PS concrete is cement: sand: gravel—1:3.2:1.6 and the amount of the cement is 400 kg/m3. The PS steel bar was placed in the PS concrete. After the concrete was exposed for 2 years in the open air, corrosion of PS steel bar was examined by breaking down the concrete. It was found that the PS steel bar kept the same external state as that before placing and was not corroded at all.

In contrast to the above, 2% (wt.) of calcium chloride per normal portland cement was merely added to the mixing water of PS concrete and PS concrete of the same proportion as the above was prepared. The PS concrete in which the same PS steel bar as the above was placed was exposed for one year in the same condition as the above and then corrosion of PS steel bar was examined by breaking down the concrete. It was found that the PS steel bar was corroded completely and pitting corrosion was randomly distributed on the whole surface.

EXAMPLE 2

Sodium nitrite and polyoxyethylene-bis-glycerol borate monostearate were mixed with 1/10 weight part and 1/250 weight part per weight part of calcium chloride, respectively, and the mixture and 2% (wt.) of calcium chloride per weight of normal portland cement were added to the mixing water of PS concrete. The proportion of the PS concrete is cement: sand: gravel=1:3.2:1.6 and the amount of the cement is 400 kg/m3. The PS steel bar was placed in the PS concrete. After the concrete was exposed for 2 years in the open air, corrosion of PS steel bar was examined by breaking down the concrete. It was found that PS steel bar kept the same external state as that before placing and was not corroded at all.

Furthermore, when bis-glycerol borate, bis-glycerol borate stearate, polyoxyethylene-bis-glycerol borate or a mixture of bis-glycerol borate and polyoxyethylne phenyl phosphate as used in Example 1 (mixing ratio, 1:1) was used at the same weight as the above in place of polyethylene-bis-glycerol borate mono-stearate, the PS steel bar kept the same external surface as that before placing.

EXAMPLE 3

The following proportion of concrete was used:

| | |
|---|---|
| Amount of cement | 294 kg/m³ |
| Normal portland cement: sand: gravel | 1:3.1:3.2 |
| water/cement ratio | 66 % |
| Slamp | 21 cm |

The sand in the concrete was sea sand containing 0.2% of chloride, and 1/4 weight part of calcium nitrite and 1/150 weight part of bis-glycerol borate per weight of the chloride were added to the concrete. A normal round steel bar SR 24 (diameter 13mm) was used. The concrete was placed into a mold (φ 15×30cm) in which the steel bar was arranged.

After the concrete was demolded, it was cured at 80°C for 2 months in the condition of 90% of relative humidity and then was broken down to examine the corrosion of the steel bar.

It was found that the steel bar was not corroded.

In contrast to the above, the corrosion of the same steel bar as the above was examined by using the same proportion of concrete as the above without adding calcium nitrite and bis-glycerol borate. In this case, about 30% of total surface of the steel bar was corroded.

What is claimed is:

1. A process for inhibiting corrosion of iron or steel placed in cement products containing a chloride which comprises adding to said cement products a nitrite and a polyoxyethylene alkyl phosphoric ester or a nitrite and a bispolyalcohol borate or bis polyalcohol borate alkylate.

2. The process of claim 1, wherein the nitrite is used 1/2-1/500 weight part per weight part of the chloride.

3. The process of claim 1 wherein 1/50-1/500 parts by weight of the polyoxyethylene alkyl phosphoric ester, bis polyalcohol borate, bis polyachol borate alkylate or mixture thereof, is added to said cement product.

4. The process of claim 1, wherein the nitrite is sodium nitrite, potassium nitrite, calcium nitrite, magnesium nitrite or zinc nitrite.

5. The process of claim 1, wherein the polyoxyethylene alkyl phosphoric ester is a monoester, a diester or a triester of the following structural formulas:

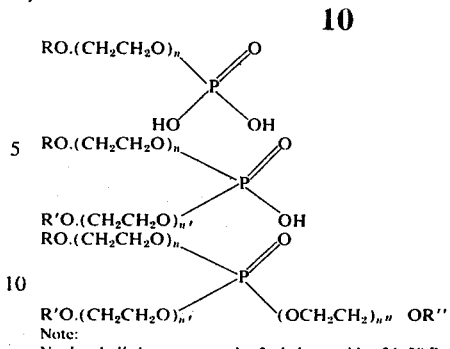

Note:
N, n' and n'' show mean mols of ethylene oxide of 1-20 R, R' and R'' show alkyl radical, phenyl radical or alkylaryl radical of 6-30 carbon atoms.

6. The process of claim 1, wherein the bispolyalcohol borate or bis polyalcohol borate alkylate is an ester of the following structural formulas:

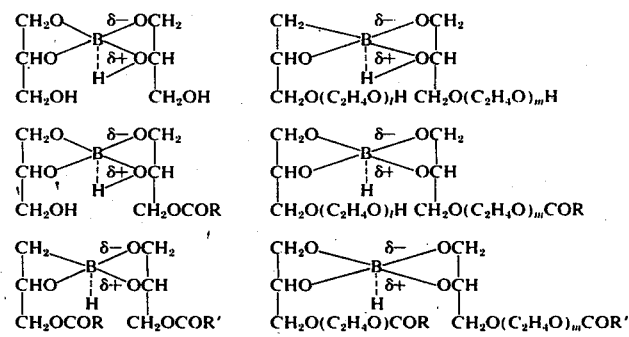

Note:
l and m are 1-20.
R and R' are an alkyl radical, a phenyl radical or an alkylaryl radical of 6-21 carbon atoms.

7. The process of claim 1, wherein the ph of the polyoxyethylene alkyl phosporic ester is adjusted to a ph value of over 6.0 by the addition of an alkali metal hydroxide, alkaline earth metal hydroxide, ammonia or triethanolamine; is then mixed with the nitrite and the resulting mixture added to said cement product.

8. The process according to claim 7, wherein the ph of the polyoxyethylene alkyl phosphoric ester is adjusted to over 6.0 by the addition of triethanolamine.

9. The process of claim 1, wherein the polyoxyethylene alkyl phosphoric ester is added to the cement and then a nitrite is added to the resultant mixture.

10. The process of claim 1 wherein a mixture of polyoxyethylene alkyl phorphoric ester and bis polyalcohol borate or bis polyalcohol borate alkylate are added.

* * * * *